United States Patent [19]

Komatsu

[11] Patent Number: 5,181,037
[45] Date of Patent: Jan. 19, 1993

[54] FM RADAR SYSTEM

[75] Inventor: Satoru Komatsu, Suginami, Japan

[73] Assignee: Honda Giken Kogyo Kabushiki Kaisha, Tokyo, Japan

[21] Appl. No.: 835,226

[22] Filed: Feb. 13, 1992

[30] Foreign Application Priority Data

Feb. 15, 1991 [JP] Japan .................................. 3-42979

[51] Int. Cl.[5] ...................... G01S 13/93; G01S 13/536; G01S 13/60
[52] U.S. Cl. ...................................... 342/70; 342/133; 342/128
[58] Field of Search ................. 342/70, 128, 146, 71, 342/72, 133, 147

[56] References Cited

U.S. PATENT DOCUMENTS

| | | | |
|---|---|---|---|
| 3,823,399 | 7/1974 | Yamanaka | 342/111 |
| 3,939,474 | 2/1976 | Coleman et al. | 342/161 |
| 4,268,828 | 5/1981 | Cribbs et al. | 342/26 |
| 4,568,938 | 2/1986 | Ubriaco | 342/87 |

FOREIGN PATENT DOCUMENTS 51107498 3/1978 Japan.
52150075 6/1979 Japan.

Primary Examiner—John B. Sotomayor
Attorney, Agent, or Firm—Lyon & Lyon

[57] ABSTRACT

A frequency modulated-continuous wave (FM-CW) radar system for detecting a range, relative speed, and direction to a target. To this end, a beat signal generator, first and second signal distributors, a beat signal frequency detector, a beat signal amplitude level detector, and at least one pair of antennas are provided. Each antenna of each pair has the same directivity, is set to radiate a beam in a slightly different direction from the beam radiated by the other antenna, and is set to receive a return beam from a target. The first signal distributor distributes an FM signal having a frequency varying with time to each of said antennas successively and repeatedly. The second signal distributor distributes a reference FM signal to a first set of input terminals of the beat signal generator successively and repeatedly. The reference signal has a frequency different from that of the FM signal, and the frequency difference is created by shifting both frequencies by different amounts or delaying both signals by different amounts. The beat signal generator generates beat signals by mixing the reference signal and a signal indicative of the return beam. The frequency detector detects the frequency of at least one of the generated beat signals and converts the frequency to provide an indication of a range to the target, and the beat signal amplitude detector converts a ratio of the beat signal levels to provide an indication of a direction to the target.

15 Claims, 5 Drawing Sheets

FM RADAR SYSTEM

BACKGROUND OF THE INVENTION

The present invention relates to FM radar systems, and in particular, to FM radar systems for detecting a direction, range, and relative speed to a target.

A radar system, which is mounted on a vehicle such as an automobile and used in conjunction with an alarm system to detect and warn of potential frontal and rearend collisions, must have a minimum range of several decimeters. For this reason, it has been recognized that for use in collision warning systems, frequency modulated-continuous wave (FM-CW) radar systems are preferred over conventional pulse radar systems. Examples of FM-CW radar systems may be found in U.S. Pat. No. 4,306,236 and Japanese Patent No. HEI 1-28915. However, the FM-CW radar systems of the prior art provide only a means for detecting a range and a relative speed to a target. These systems do not provide a means for detecting a direction to a target.

The present applicant has filed a Japanese patent application, HEI 2-121366, which discloses an FM radar system capable of detecting a direction to a target in addition to a range and relative speed to the target. This Japanese application, filed Feb. 15, 1991, has not yet been laid open to public inspection.

According to the FM radar system described in the prior Japanese application, because the longest range to be detected is about several hundred meters at most, beams in the frequency range of about 60 Ghz, which are rapidly attenuated upon propagation, are radiated to avoid interference from microwave transmission systems already in existence.

To detect a direction to a target in addition to a range and relative speed to the target, a pair of antennas, each having a main lobe of the same directivity, are set to radiate beams in slightly different directions respectively. Further, a ratio of amplitudes of beat signals produced by mixing radiated, reflected, and received FM signals and non-radiated reference FM signals are detected to indicate the direction to the target.

In the disclosed FM radar system, frequencies of the beat signals are decreased as the range to a target decreases, thus causing an increase of disturbance by 1/f noise generated in the mixers. As a result, it becomes more difficult for the system to detect the frequencies and the amplitudes of the beat signals as the range to a target becomes shorter. For example, if a range to be detected is as short as one meter, the propagation delay time will be about 7 ns. In the case where the period in which frequency is increased or decreased linearly is 100 $\mu$s, and a maximum change of frequency in the period is 400 Mhz, the frequencies of the beat signals will be as low as about 30 Khz. As a result, the beat signals output from the mixers will be strongly disturbed by 1/f noise. This problem is especially serious where FM radar systems are used over a very short range to detect and avoid collisions or contact between automobiles.

To solve this problem, the FM radar system, according to the prior Japanese application, raises the frequencies of the beat signals in the following manner. Specifically, the FM signals to be radiated are produced by multiplying the frequencies of original FM signals by N times, and the FM signals to be used as reference signals are produced by multiplying the frequencies of the same original FM signals by (N−1) times. However, this frequency increase results in another problem in that the modified FM radar system becomes more complicated and expensive.

SUMMARY OF THE INVENTION

Accordingly, it is an object of the present invention to provide an FM radar system of more simple construction wherein the frequencies of beat signals are increased to reduce the disturbance by 1/f noise.

Another object of the invention is to provide an FM radar system in which a direction to a target can be detected in addition to a range to the target.

Still another object of the invention is to provide an FM radar system in which a relative speed to a target can be detected in addition to a range and direction thereto.

Still another object of the invention is to provide an FM radar system in which interference between a pair of antennas each radiating an FM signal of the same frequency is avoided.

These and other objects of the present invention will be attained by providing an FM radar system for measuring a range and a direction to a target comprising:

at least one pair of antennas, each antenna of each pair having substantially the same directivity, each antenna being set to radiate a beam in a slightly different direction from the beam radiated by the other antenna, and each antenna being set to receive a return beam, said return beam comprising a beam radiated by the antenna and reflected by a target;

a first signal distributing means for distributing an FM signal having a frequency varying with time to each of said antennas successively and repeatedly;

means for generating beat signals having varying frequencies successively and repeatedly, said beat signal generating means having a first and second set of input terminals, said first set of input terminals being adapted to receive a signal indicative of said return beam;

a second signal distributing means for distributing a reference FM signal to said second set of input terminals of said beat signal generating means, the reference FM signal having a different frequency from that of said FM signal, and the difference being caused by shifting both frequencies by different amounts or delaying both signals by different amounts;

means for detecting the frequency of at least one of said generated beat signals and converting the frequency to provide an indication of a range to said target; and means for detecting a ratio of levels of the beat signals and converting the ratio to provide an indication of a direction to said target.

DETAILED DESCRIPTION OF THE PREFERRED EMBODIMENTS

Figure 1:
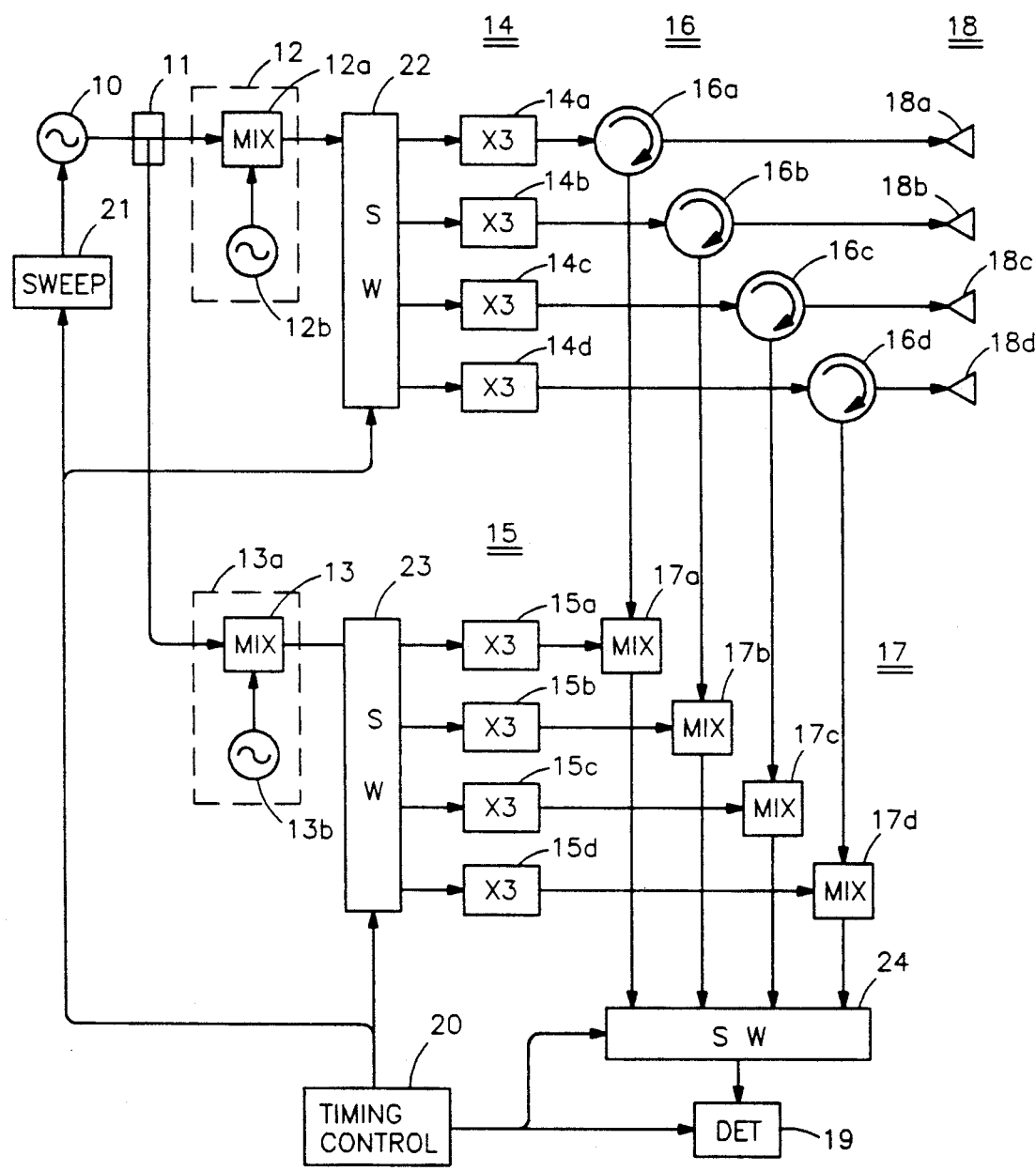
FIG. 1 is a block diagram of an FM radar system according to a first embodiment of the invention.

An FM radar system according to a first embodiment of the present invention will be described with reference to FIGS. 1 and 2. As shown in FIG. 1, the FM radar system includes a sweep oscillator 10, a power divider 11, up-converters 12 and 13, two groups of triple frequency multipliers 14 and 15, a group of circulators 16, a group of mixers 17, a group of antennas 18, a detecting circuit 19, a timing control circuit 20, a sweep circuit 21, and switching circuits 22 and 23.

A microwave FM signal generated by the sweep oscillator 10 and oscillating under the control of the sweep circuit 21 is supplied to the power divider 11. The power divider 11 divides the signal into two parts, each having equal amplitude, and supplies the resulting signals to up-converters 12 and 13, respectively. The up-converter 12 comprises a mixer 12a, a local oscillator 12b for generating microwave signals, and a band pass filter (not shown in FIG. 1). The up-converter 13 comprises a mixer 13a, a local oscillator 13b for generating microwave signals, and a band pass filter (not shown in FIG. 1).

The frequencies of FM signals supplied from the power divider 11 are raised by up-converters 12 and 13, and the up-converted signals are supplied to switching circuits 22 and 23, respectively. The frequencies of microwave signals generated by local oscillators 12b and 13b are set to appropriate values which differ from each other to produce an appropriate difference of frequencies (for example, a difference of 2 Ghz) between signals output from the up-converters 12 and 13.

Figure 2:
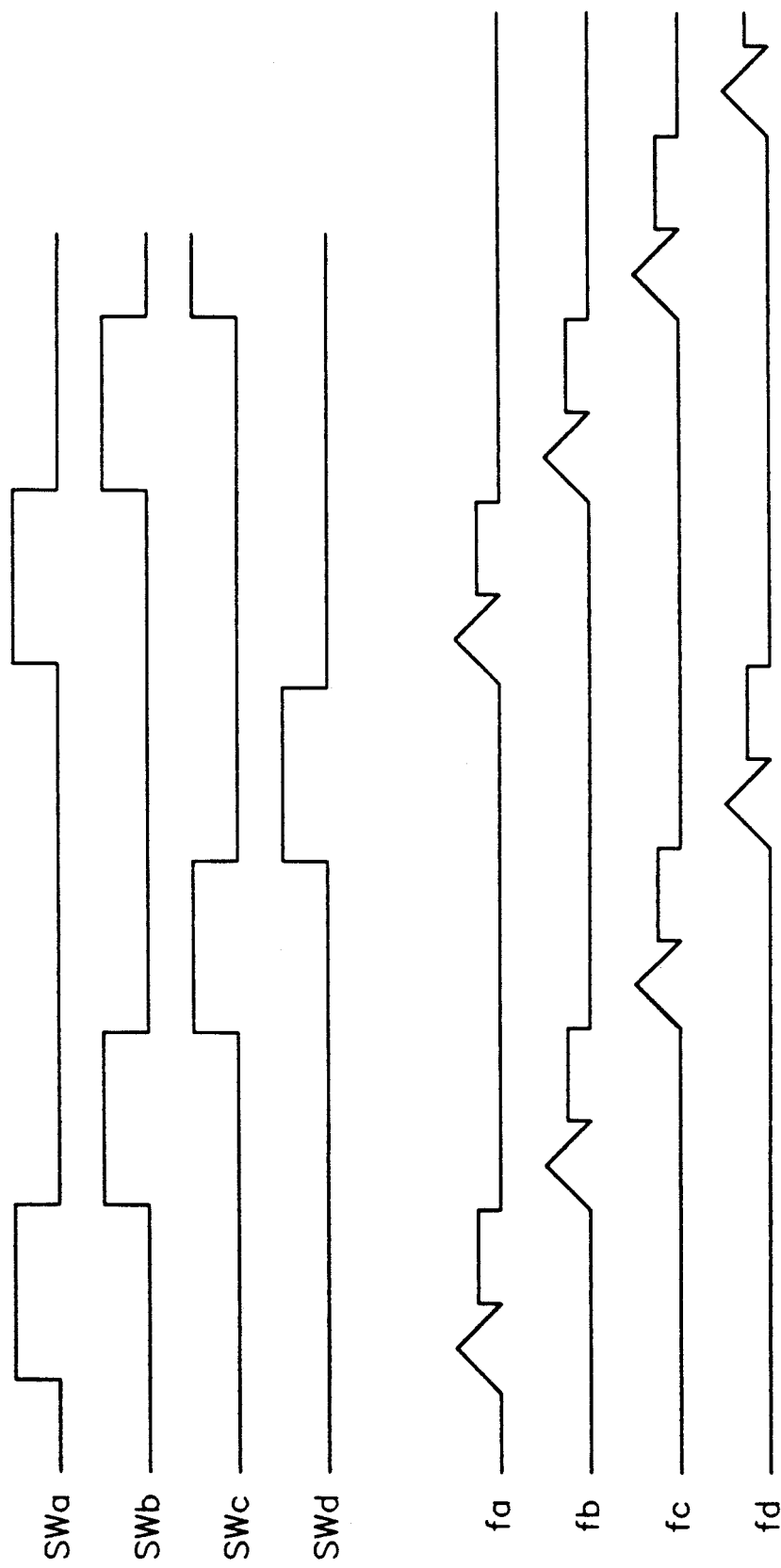
FIG. 2 is a drawing of a set of wave forms useful in understanding the operation of the radar system shown in FIG. 1.

As illustrated by the four wave forms Swa to Swd in FIG. 2, to distribute the FM signal output from up-converter 12 to one of four triple frequency multipliers 14a-14d successively and repeatedly, four switching elements, comprising pin diodes, for example, in the switching circuit 22 are rendered to be on and off successively for a predetermined period in sync with the control signal supplied from timing control circuit 20. Similarly, four switching elements in the switching circuit 23 are rendered to be on and off successively for a predetermined period in sync with the control signal supplied from the timing control circuit 20 to distribute the FM signal output from up-converter 13 to one of four triple frequency multipliers 15a-15d successively and repeatedly.

Figure 5:
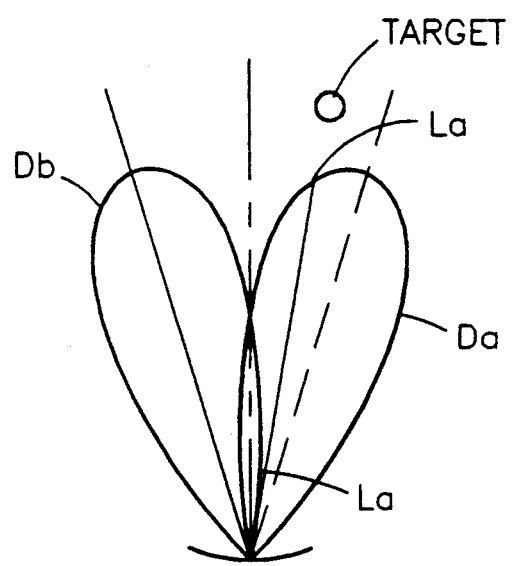
FIG. 5 is a drawing illustrating a relation between directivities and directions of a pair of antennas and a direction to a target.

High frequency FM signals, which are output from the frequency multipliers 14a-14d successively and have a wave length on the order of a millimeter (mm waves), are supplied to antennas 18a-18d through circulators 16a-16d, and radiated from the antennas 18a-18d successively. The antennas 18a and 18b are set to form a pair as shown in FIG. 5 and to radiate beams of the FM signals of mm waves of the same directivity in slightly different directions from each other. Similarly, the antennas 18c and 18d are set to form a pair as shown in FIG. 5 and to radiate beams of the FM signals of mm waves of the same directivity in slightly different directions from each other.

In this embodiment, a pair of antennas 18a and 18b is set to detect a direction to a target in a horizontal plane, and a pair of antennas 18c and 18d is set to detect a direction to a target in a perpendicular plane.

FM signals which are output successively from the switching circuit 23 are supplied to the frequency multipliers 15a-15d successively. FM signals comprising mm waves are output from the frequency multipliers 15a-15d and supplied to one of the second input terminals of the mixers 17a-17d successively as reference FM signals. Reflected beams from a target received by antennas 18a-18d successively are supplied to one of the first input terminals of the mixers 17a-17d successively. Beat signals generated in the mixers 17a-17d are supplied to the detecting circuit 19 through selector 24 which is selectively switched by the control signal supplied from the timing control circuit 20.

Illustrated as wave form fa in FIG. 2, the frequency of the beam radiated from the antenna 18a is increased and decreased linearly with time in a first half period of radiation and fixed to a constant value in the following half period of radiation. Similarly, each of the frequencies fb to fd of beams radiated from antennas 18b-18d is increased and decreased linearly with time in a first half period of radiation and fixed to a constant value in the following half period of radiation. Such frequency control is carried out by sweep circuit 21 by generating a signal of a voltage of the same wave form in sync with the timing signal supplied from the timing control circuit 20 and supplying it to the oscillator 10 which functions as a voltage controlled oscillator (VCO).

In the detecting circuit 19, amplitude levels of beat signals output from a pair of mixers 17a and 17b are detected. These detected levels of beat signals reflect the levels of reflected beams received by antennas 18a and 18b, respectively. Referring to FIG. 5, if the directivities and the directions of the beams radiated from a pair of antennas 18a and 18b are as shown by loops Ba and Db, respectively, and if a direction to a target is as shown in FIG. 5, then the levels La and Lb shown in FIG. 5 reflect the levels of reflected beams received by antennas 18a and 18b, respectively.

Thus, a ratio of levels of beat signals is calculated in the detection circuit 19, and this ratio may be converted to a direction to the target in a horizontal plane. Similarly, a second ratio of levels of beat signals output from a pair of mixers 17c and 17d are detected, and this second ratio may be converted to a direction to the target in a perpendicular plane.

Also in the detection circuit 19, the frequency of a beat signal is detected in the above-mentioned first half period of radiation wherein the frequency is increased and decreased linearly, and the range to a target is calculated using the detected frequency which provides an indication of the propagation delay time of a radiated and reflected beam. Further, in the detection circuit 19, the frequency of a beat signal is detected in the second half period of radiation in which the frequency is kept constant, and the relative speed to a target is calculated using the detected frequency which includes a component of Doppler shift.

As mentioned above, the range to a target, as well as the direction and relative speed to a target, can all be calculated from the detected frequencies of beat signals and the ratio of levels of beat signals. In the calculation of the range and the relative speed, a single beat signal frequency output from one of four mixers 17a-17d may be detected, or all of the beat signal frequencies output from mixers 17a-17d may be detected to produce an average beat signal frequency. In this embodiment, the converted frequencies of the signals output from up-converters 12 and 13 are set to have an appropriate difference, for instance, a difference of about 2 Ghz, between them. As a result, the frequencies of beat signals output from mixers 17a to 17d are shifted to higher values to avoid any disturbance caused by 1/f noise.

Figure 3:
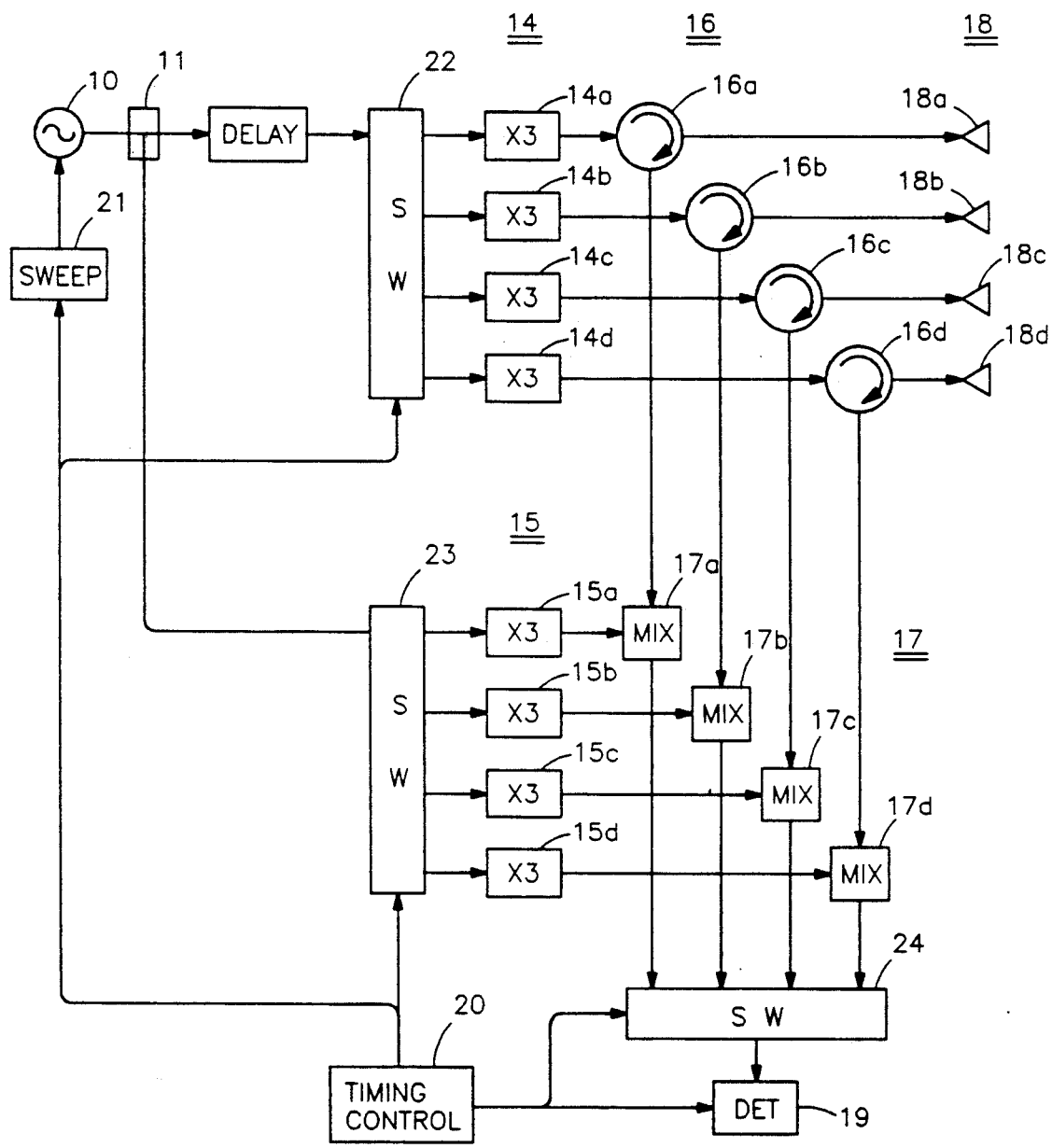
FIG. 3 is a block diagram of an FM radar system according to a second embodiment of the invention.

FM radar systems according to a second embodiment of the present invention will be described with reference to FIGS. 3 and 4. As shown in FIG. 3, the FM radar system includes a sweep oscillator 10, a power divider 11, a delay circuit 25, two groups of triple frequency multipliers 14 and 15, a group of circulators 16, a group of mixers 17, a group of antennas 18, a detecting circuit 19, a timing control circuit 20, a sweep circuit 21, and switching circuits 22 and 23.

The elements in FIG. 3 having the same reference numerals as those in FIG. 1 are the same elements already described with reference to FIG. 1, and duplicated descriptions of those elements are unnecessary. The FM radar system shown in FIG. 3 differs from the system shown in FIG. 1 in that up-converters 12 and 13 are eliminated and a delay circuit 25 is added between the power divider 11 and switching circuits 22.

Figure 4:
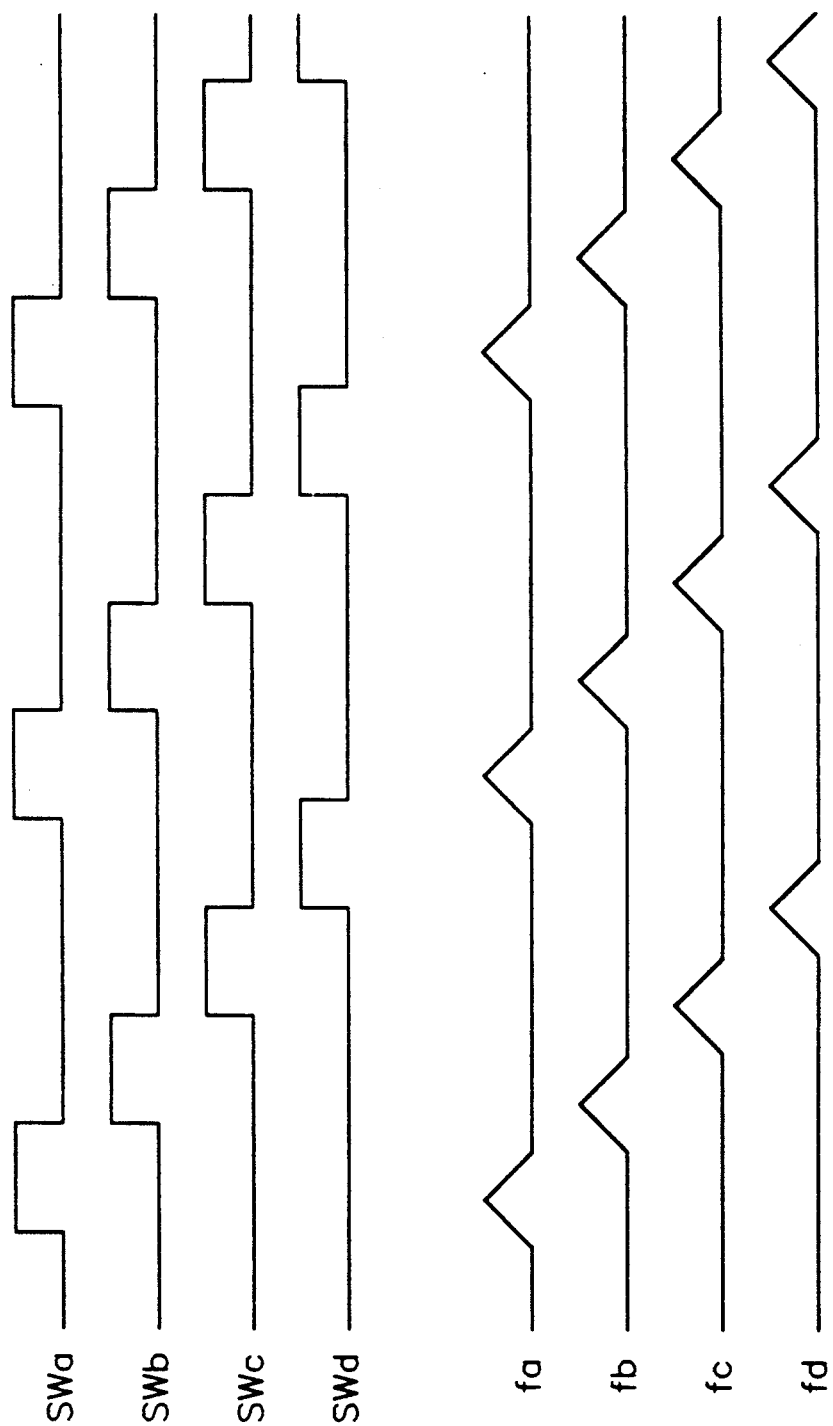
FIG. 4 is a drawing of a set of wave forms useful in understanding the operation system shown in FIG. 2.

In a similar manner as that described in FIG. 2, distribution of FM signals to triple frequency multipliers 14a-14d through the switching circuit 22 and to triple frequency multipliers 15a-15d through the switching circuit 23 is carried out as illustrated by the four wave forms Swa-Swd in FIG. 4. However, the frequencies of beams to be radiated from antennas 18a-18d are increased and decreased linearly during the whole period of radiation, as shown as four wave forms fa-fd in FIG. 4.

In the FM radar system of this embodiment, the frequency of each of the beat signals having no constant parts is separated into a first component caused by the propagation delay time, and a second component caused by Doppler shift, the range to a target is detected from the separated first component, and the relative speed to a target is detected from the separated second component as follows.

If the frequency of the beam in the upsweep period wherein the frequency is increased linearly is designated as FU, and the frequency of the beam in the downsweep period wherein the frequency is decreased linearly is designated as FD, the frequencies are described as follows.

$$FU = fo + \delta f(t/T) \quad (1)$$

$$FD = fo - \delta f(t/T) \quad (2)$$

Here, fo and $\delta f$ are constants having dimensions of frequency and T is a constant having a dimension of time.

Further, letting a time required for the radiated beams to go and return between antennas and a target be $\tau$, the change of frequency caused by Doppler shift be fp, the frequency of each of the reflected beams received by antennas in the period of the upsweep be fru, the frequency of each of the reflected beams received by antennas in the period of the downsweep be frd, and the delay time to be added to the FM signal which passes through the delay circuit 25 be $\tau d$, then the following relations are obtained.

$$FrU = fo + \delta f[(t-\tau')/T] + fp \quad (3)$$

$$FrD = fo - \delta f[(t-\tau')/T] + fp \quad (4)$$

$$\tau' = \tau + \tau d \quad (5)$$

The frequency fbu of each of the beat signals output from mixers 17a-17d in the period of the upsweep and the frequency fbd of the beat signals output from mixers 17a-17d in the period of the downsweep is described as follows.

$$\begin{aligned} FbU &= fru - Fu \\ &= fp - (\tau'/T)\delta f \end{aligned} \quad (6)$$

$$\begin{aligned} FbD &= frd - Fd \\ &= fp + (\tau'/T)\delta f \end{aligned}$$

From equations (5) and (7), the delay time of propagation $\tau$ and the frequency change by Doppler shift fp are obtained as follows.

$$\tau = [(fbd - fbu)/2](T/\delta f) - \tau d \quad (8)$$

$$fp = (fbd - fbu)/2 \quad (9)$$

If the velocity of propagation of the radiated and reflected beam is designated as c, the range to a target D is obtained as follows from equation (10).

$$\begin{aligned} D &= c \cdot \tau/2 \\ &= c[(fbd - fbu)/2][T/(2\delta f)] - c \cdot \tau d/2 \end{aligned} \quad (10)$$

Also the relative velocity between a target V is determined as follows.

$$\begin{aligned} V &= c(fp/fo) \\ &= c(fbd + fbu)/(2fo) \end{aligned} \quad (11)$$

One advantage of the FM radar system according to the second embodiment is that a shift of the frequencies of the beat signals to higher values is realized, and disturbance by 1/f noise is avoided. This advantage is achieved by merely adding the delay circuit 25 between the power divider 11 and switching circuit 22. As a result, complex and expensive up-converters required in the FM radar system of the first embodiment can be eliminated, thus reducing the cost for manufacturing the system.

Moreover, a degradation of accuracy of detection due to a relative change of frequencies between up-converters can be effectively avoided by replacing them with the signal delay circuit 25.

While the invention has been described in detail and with reference to specific embodiments thereof, it would be apparent to those skilled in the art that various changes and modifications may be made therein without departing from the spirit and scope of the invention.

What is claimed is:

1. AN FM radar system for measuring a range and a direction to a target comprising:
   at least one pair of antennas, each antenna of each pair having substantially the same directivity, each antenna being set to radiate a beam in a slightly different direction from the beam radiated by the other antenna, and each antenna being set to receive a return beam, said return beam comprising a beam radiated by the antenna and reflected by a target;
   a first signal distributing means for distributing an FM signal having a frequency varying with time to each of said antennas successively and repeatedly;
   a second signal distributing means for distributing a reference FM signal having a different frequency from that of said FM signal, and the difference being caused by shifting both frequencies by different amounts or delaying both signals by different amounts;

means for successively and repeatedly generating beat signals, each beat signal having a frequency, said beat signal generating means having a first and second set of input terminals, said first set of input terminals being adapted to receive a signal indicative of said return beam, and said second set of input terminals being adapted to receive said reference FM signal from said second signal distributing means;

means for detecting the frequency of at least one of said generated beat signals and converting the frequency to provide an indication of a range to said target; and means for detecting a ratio of levels of the beat signals and converting the ratio to provide an indication of a direction to said target.

2. An FM radar system according to claim 1 wherein said first signal distributing means includes a first up-converter to shift up the frequency of a low frequency FM signal to a first value; and said second signal distributing means includes a second up-converter to shift up the frequency of a second low frequency FM signal to a second value being different from said first value.

3. An FM radar system according to claim 1 wherein one of said first and second signal distributing means includes a means for delaying a signal to be distributed by a different amount.

4. An FM radar system according to claim 3 wherein each of said first and second signal distributing means includes a pair of frequency multipliers and a switching means for distributing FM signals to said frequency multipliers successively.

5. An FM radar system according to claim 4 wherein the FM radar system includes two pairs of antennas, one being set for detecting a direction of a target in a horizontal plane and the other being set for detecting a direction of a target in a perpendicular plane.

6. An FM radar system for measuring a range, a direction, and a relative speed to a target comprising:

at least one pair of antennas, each antenna of each pair having substantially the same directivity, each antenna being set to radiate beams in a slightly different direction from the beams radiated by the other antenna, and each antenna being set to receive return beams, said return beams comprising beams originally radiated by the antenna and then reflected by a target;

a first signal distributing means for distributing an FM signal having a frequency varying with time to each of said antennas successively and repeatedly;

a second signal distributing means for distributing a reference FM signal having a different frequency from that of said FM signal, and the difference being caused by shifting both frequencies by different amounts or delaying both signals by different amounts;

means for successively and repeatedly generating beat signals, each beat signal having a frequency, said beat signal generating means having a first and second set of input terminals, said first set of input terminals being adapted to receive a signal indicative of said return beam, and said second set of input terminals being adapted to receive said reference FM signal from said second signal distributing means;

means for detecting the frequency of at least one of said generated beat signals and separating it into two parts, one part being caused by Doppler shift and the other part being caused by a propagation delay time of said return beams, and converting the first part to a relative speed to said target and the second part to a range to said target respectively; and a means for detecting a ratio of levels of beat signals and converting the ratio to a direction to said target.

7. An FM radar system according to claim 6 wherein said first signal distributing means includes a first up-converter to shift up the frequency of a low frequency FM signal to a first value; and said second signal distributing means includes a second up-converter to shift up the frequency of a second low frequency FM signal to a second value being different from said first value.

8. An FM radar system according to claim 7 wherein one of said first and second signal distributing means includes a means for delaying a signal to be distributed by a different amount.

9. An FM radar system according to claim 8 wherein each of said first and second signal distributing means includes a pair of frequency multipliers and a switching means for distributing FM signals to said frequency multipliers successively.

10. An FM radar system according to claim 9 wherein the FM radar system includes two pairs of antennas, one being set for detecting a direction of a target in a horizontal plane and the other being set for detecting a direction of a target in a perpendicular plane.

11. An FM radar system for measuring a range, a direction, and a relative speed to a target comprising:

at least one pair of antennas, each antenna of each pair having substantially the same directivity, each antenna being set to radiate beams in a slightly different direction from the beams radiated by the other antenna, and each antenna being set to receive return beams, said return beams comprising beams originally radiated from the antenna and then reflected by a target;

a first signal distributing means for distributing an FM signal to each of said antennas successively and repeatedly, the FM signal having a frequency varying with time during a first half period and having fixed to a constant value during a following half period;

a second signal distributing means for distributing a reference FM signal having a different frequency from that of said FM signal, and the difference being caused by shifting both frequencies by different amounts or delaying both signals by different amounts;

means for successively and repeatedly generating beat signals, each beat signal having a frequency, said beat signal generating means having a first and second set of input terminals, said first set of input terminals being adapted to receive a signal indicative of said return beam, and said second set of input terminals being adapted to receive said reference FM signal from said second signal distributing means;

means for detecting at least one of the frequencies of said generated beat signals during said first period and converting it to a range to said target;

means for detecting at least one of said generated beat signals during said second period and converting it to a relative speed to said target; and means for detecting a ratio of levels of the beat signals and converting the ratio to a direction to said target.

12. An FM radar system according to claim 11 wherein said first signal distributing means includes a first up-converter to shift up the frequency of a low frequency FM signal to a first value; and said second signal distributing means includes a second up-converter to shift up the frequency of a second low frequency FM signal to a second value being different from said first value.

13. An FM radar system according to claim 12 wherein one of said first and second signal distributing means includes a means for delaying a signal to be distributed by a different amount.

14. An FM radar system according to claim 13 wherein each of said first and second signal distributing means includes a pair of frequency multipliers and a switching means for distributing FM signals to said frequency multipliers successively.

15. An FM radar system according to claim 14 wherein the FM radar system includes two pairs of antennas, one being set for detecting a direction of a target in a horizontal plane and the other being set for detecting a direction of a target in a perpendicular plane.

* * * * *